Nov. 3, 1931.  I. C. PALMER  1,830,713
SEWER CATCH BASIN UNIT
Filed Jan. 28, 1931  2 Sheets-Sheet 2

INVENTOR.
Isaac C. Palmer,
BY
Geo. P. Kimmel
ATTORNEY.

Patented Nov. 3, 1931

1,830,713

UNITED STATES PATENT OFFICE

ISAAC CHARLES PALMER, OF PITTSBURGH, PENNSYLVANIA

SEWER CATCH BASIN UNIT

Application filed January 28, 1931. Serial No. 511,889.

This invention relates to a sewer catch basin and has for its object to provide, in a manner as hereinafter set forth, a structure of the class referred to that can be conveniently set up in one complete unit on the sidewalk of any street and having on outlet leading to the sewer, a trap or seal to prevent the emission of gas from the sewer to the surface and the entrance of grit or solid matter into the outlet, and removable means positioned below and adjacent the trap or seal for collecting such grit or solid matter which has entered the basin or unit.

Further objects of the invention are to provide, in a manner as hereinafter set forth, a sewer catch basin unit which is comparatively simple in its construction and arrangement, strong, durable, capable of being readily installed on the sidewalk, thoroughly efficient in its use, conveniently cleaned, and comparatively inexpensive.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1:
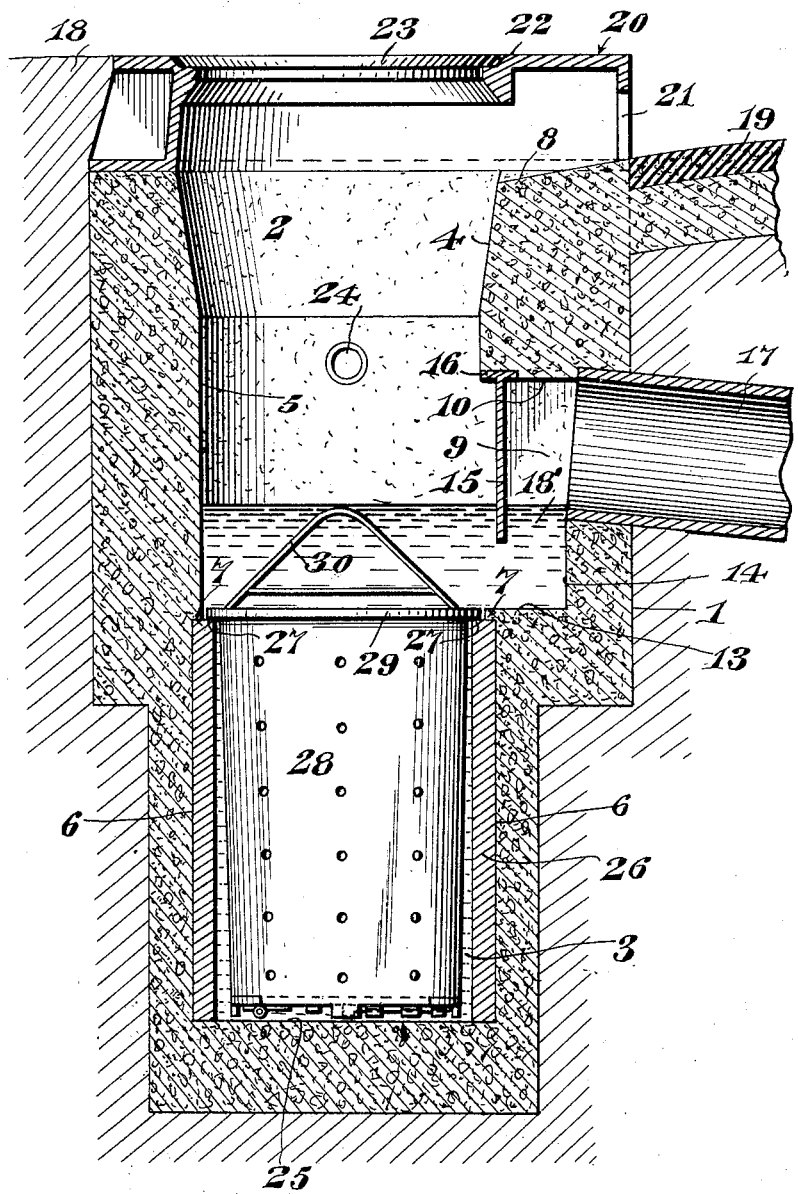
Figure 1 is a vertical sectional view of a sewer catch basin unit in accordance with this invention.
Figure 2:
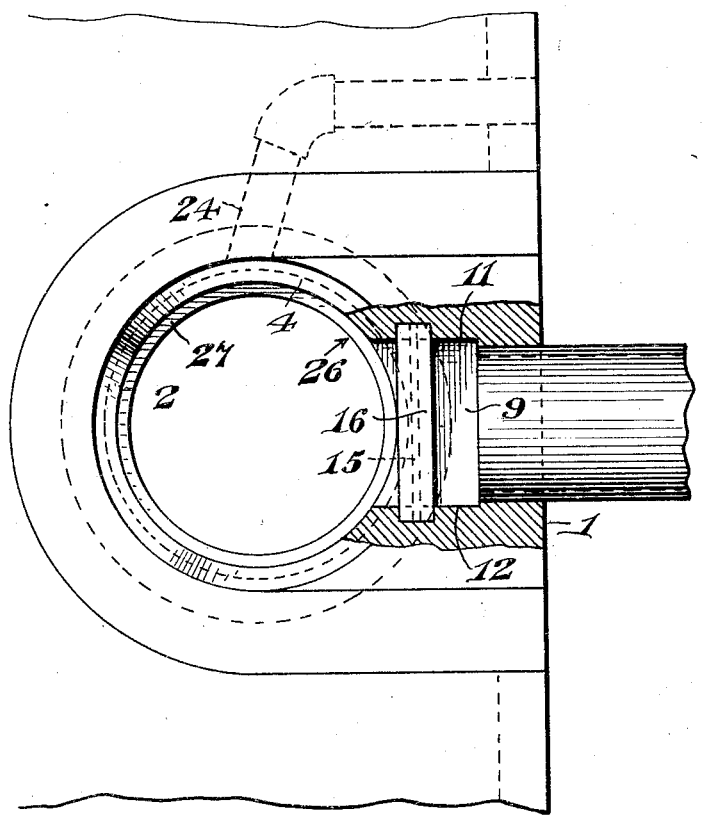
Figure 2 is a top plan view thereof with the cover removed and partly in section.
Figure 3:
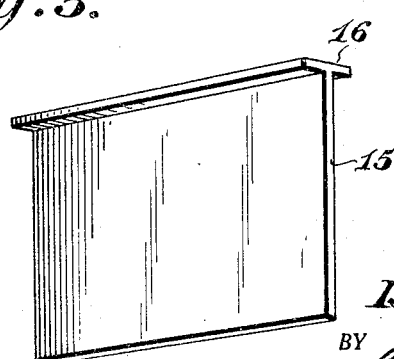
Figure 3 is a perspective view of the trap plate.

The sewer catch basin unit in accordance with this invention includes a vertically disposed, tubular, open top and closed bottom unitary concrete structure 1 arranged below the sidewalk and having its top flush with the street surface or level. The structure 1 provides an upper chamber 2 and a lower chamber 3.

The wall of chamber 2 has an upper flaring part 4 and a lower part 5 of uniform diameter. The chamber 3 is of uniform diameter throughout and has its walls 6 outset with respect to the lower part 5 of the wall of chamber 2 thereby forming a shoulder 7 at the lower end of chamber 2. The bottom or lower end of chamber 2 opens into the top of chamber 3. The chamber 2 is what is termed the intake chamber of the basin and the chamber 3 a removable collector receiving chamber.

The top edge of structure 1, at the front thereof slopes downwardly, as at 8 in a direction towards chamber 2.

The structure 1 is provided with a trapping chamber 9 which is offset with respect to chambers 2, 3 and extends laterally from the lower portion of chamber 2. The chamber 9 is of rectangular contour and includes a top wall 10, a pair of side walls 11, 12, a flat bottom 13, an outer wall 14 and an inner wall of less height than the outer wall. The inner wall is provided by a trap plate 15 of T-shaped cross section. The head 16 of plate 15 is embedded in the top wall 10. The plate 15 has its lower edge spaced above the bottom wall 13 to provide an intake for chamber 9. The side edges of plate 15 extend into the side walls 11, 12. The bottom 13 of chamber 9 is positioned slightly above the lower end of chamber 2. The plate 15 is spaced from the wall 14.

Opening into the chamber 9, through the wall 14, at a point above the bottom 13 of the chamber 9, is a conduit 17 which leads to the sewer, not shown. The conduit 17 extends at a downward inclination from the structure 1. The plate 15 depends below that end of the conduit 17 which opens into the chamber 9. The arrangement of the chamber 9 with respect to the chambers 2, 3 and conduit 17 provides a water seal 18′ to prevent the emission of gas from the sewer through the basin to the surface. Embedded in and flush with the sidewalk 18 and extending to the street surface 19 is a metallic cover element 20 for the open top of structure 1. The element 20 is formed with an inlet 21 over the outer end of the sloping portion 8 of the top edge of structure 1. The said sloping portion 8 at its outer end being flush with the street surface 19. The element 20 is provided with an opening 22 in which is normally arranged a removable closure 23 and by this arrangement access can be had through the element 20 to the interior of structure 1.

Leading from the gutter and opening into the lower part of chamber 2 is a drain pipe 24.

Positioned within the chamber 3, abutting throughout the wall 6 of the latter and extending from shoulder 7 to the bottom 25 of chamber 3 is a tubular member or cylinder 26 having its body of a thickness to project from shoulder 7. That portion of the top edge of the cylinder 26 which projects from the shoulder 7 and which is indicated at 27 provides an endless supporting ledge for a purpose to be presently referred to.

Suspended within the cylinder 26 from the top edge portion 27 of the latter is a removable collector 28 for grit or solid matter which has entered the basin. The collector 28 is of the open top, perforated body and perforated dumping bottom type. The collector 28 at its top is provided with an outwardly directed annular flange 29 which seats upon the edge portion 27 and closes the top of chamber 3. The collector 28 has its body thereof slightly decreasing in diameter from its top to its bottom whereby the body will be spaced from the cylinder 26. The collector 28 at its top is provided with an outwardly directed annular flange 29 which seats upon the edge portion 27 and closes the top of chamber 3. The collector 28 is provided with an upstanding, braced rigid handle 30 for connection therewith of an elevating means for the purpose of removing the collector carrying the collected grit or solid matter.

What I claim is:—

In a sewer catch basin, an open top and closed bottom, vertically disposed, tubular, unitary concrete structure having the upper portion of its inner face flared, the intermediate portion of its inner face of uniform diameter and the lower portion of its inner face of uniform diameter and of greater diameter than said intermediate portion, said structure providing an upper and lower chamber opening into each other, the wall of the upper chamber being provided by the upper and intermediate portions of the inner face of said structure, the wall of the lower chamber being provided by the lower portion of the inner face of said structure, said structure being cut away at its inner face to provide a rectangular trapping chamber offset with respect to the lower part of the upper chamber, a vertically disposed element of less height than the trapping chamber anchored at its top and sides in said structure and providing the inner wall of the trapping chamber, said structure having an outlet for said trapping chamber, the diameter of the said intermediate and lower portions of said inner face being such to provide the structure with an internal annular shoulder extending inwardly from and at right angles to the top of said lower chamber, and a tubular member interposed between said shoulder and bottom of said lower chamber and abutting throughout the wall of the latter, the body of said member being of a thickness to project beyond said shoulder to provide a supporting ledge for suspending a catch basin bucket.

In testimony whereof, I affix my signature hereto.

ISAAC CHARLES PALMER.